United States Patent
Baltoiu et al.

(10) Patent No.: US 7,332,458 B2
(45) Date of Patent: Feb. 19, 2008

(54) DRILLING FLUID

(75) Inventors: Len Baltoiu, Calgary (CA); Flori Baltoiu, Calgary (CA); Brent Warren, Calgary (CA)

(73) Assignee: Q'Max Solutions Inc., Calgary, Alberta (CA)

( * ) Notice: Subject to any disclaimer, the term of this patent is extended or adjusted under 35 U.S.C. 154(b) by 420 days.

(21) Appl. No.: 10/815,826

(22) Filed: Apr. 2, 2004

(65) Prior Publication Data

US 2004/0204324 A1    Oct. 14, 2004

Related U.S. Application Data

(60) Provisional application No. 60/460,878, filed on Apr. 8, 2003.

(51) Int. Cl.
*C09K 8/08* (2006.01)
(52) U.S. Cl. .................. 507/110; 507/111; 507/113
(58) Field of Classification Search ........... 507/110, 507/111, 113
See application file for complete search history.

(56) References Cited

U.S. PATENT DOCUMENTS

| | | | | |
|---|---|---|---|---|
| 3,346,489 A | * | 10/1967 | Dickson et al. ............. | 507/129 |
| 3,653,441 A | * | 4/1972 | Tuttle ........................ | 166/291 |
| 3,830,735 A | * | 8/1974 | Tsuk ........................ | 516/161 |
| 3,929,632 A | * | 12/1975 | Buriks et al. ............... | 516/174 |
| 4,169,798 A | * | 10/1979 | DeMartino .................. | 507/201 |
| 4,331,554 A | * | 5/1982 | Quinlan ..................... | 516/149 |
| 4,619,776 A | * | 10/1986 | Mondshine ................. | 507/211 |
| 5,248,449 A | * | 9/1993 | Mitchell et al. ............ | 516/150 |
| 5,439,059 A | * | 8/1995 | Harris et al. ................ | 166/300 |
| 6,339,048 B1 | | 1/2002 | Santhanam et al. ........ | 507/131 |
| 6,455,474 B1 | | 9/2002 | Wittenbrink et al. ....... | 507/103 |
| 6,488,091 B1 | * | 12/2002 | Weaver et al. ............. | 166/300 |
| 6,489,270 B1 | | 12/2002 | Vollmer et al. ............ | 507/261 |
| 6,489,272 B2 | | 12/2002 | Gatlin ....................... | 508/452 |
| 6,518,224 B2 | | 2/2003 | Wood ........................ | 507/118 |
| 2001/0000468 A1 | * | 4/2001 | Mak et al. .................. | 424/401 |
| 2002/0019318 A1 | * | 2/2002 | Harris ....................... | 507/200 |
| 2005/0187114 A1 | * | 8/2005 | Lehman et al. ............ | 507/211 |

* cited by examiner

*Primary Examiner*—Kuo-Liang Peng
(74) *Attorney, Agent, or Firm*—Paul S. Sharpe; Ogilvy Renault LLP

(57) ABSTRACT

A drilling fluid for use in high oil viscosity formations containing tar, sand and oil entrained therein. The drilling fluid can be comprised of a polymer in an amount from between 0.05% and 5% by volume, a solvent in an amount from between 1% and 20% by volume and de-emulsifier in an amount from between 0.05% and 10% by volume.

3 Claims, No Drawings

DRILLING FLUID

CROSS-REFERENCE TO RELATED APPLICATIONS

This application claims the benefit of U.S. Provisional Application No. 60/460,878, filed Apr. 8, 2003.

FIELD OF THE INVENTION

The present invention relates to drilling fluid and more particularly, the present invention relates to a drilling fluid composition adapted for use in high oil viscosity applications such as steam assisted gravity drainage (SAGD) and soak radial wells.

BACKGROUND OF THE INVENTION

In the existing technology, there is a wide variety of documents relating to drilling fluids and related materials.

It is known that drilling fluid, also referred to as drilling mud, is an important part of a drilling operation. The fluid is important to effect transport of debris, undesirable materials, gas etc. The fluid also functions to maintain lubrication and act as a coolant of the drill bit which experiences enormous force, friction and other stresses.

Typical of the presently used fluids is Kim Mud (a blend of polysaccharide polymers, calcium carbonate, calcium lignosulfonate). This material provides high carrying capacity by an inherent thixotropic viscosity. The composition may contain potassium ions for reducing volume increases (swelling). This has the advantage of preventing hydration of moisture sensitive clays.

D-limonene has also been used in drilling fluid and is particularly favored in view of the fact that it is a natural substance extracted from citrus rind.

Various amines have also been used to augment drilling fluid and provide a variety of advantages in different operating conditions.

It would be desirable to have a fluid capable of cleaning tar out of sand and incorporate the oil in an emulsion with subsequent release. Most of the fluids in current use are based upon preventing the tar (heavy oil) from entering the mud.

SUMMARY OF THE INVENTION

One object of the present invention is to provide an improved drilling fluid which is not limited as the prior art compositions.

A further object of one embodiment of the present invention is to provide a drilling fluid for use in drilling high oil viscosity formations (tar, sand and oil entrained therein), comprising:
  a water base viscosifying polymer in an amount from between 0.05% and 5% by volume;
  a solvent in an amount from between 1% and 20% by volume; and
  a de-emulsifier in an amount from between 0.05% and 10% by volume.

Advantageously, the composition is environmentally friendly, results in greater than 90% sand removal and is resistant to common drilling contaminants such as solids, gypsum, lime and salt inter alia.

Perhaps one of the most important features of the composition is ease with which the emulsion is broken to provide the oil and water as discrete phases. By enzymatic action, the emulsion is de-emulsified and this has been observed over a wide temperature range. In fact, the emulsion is broken in the absence of energy input, a significant feature.

A still further object of one embodiment of the present invention is to provide a method of recovering oil from tar sands containing tar, oil and sand, comprising:
  providing a composition containing a polymer, solvent for solving oil and tar from said tar sands and an emulsifier;
  mixing compounds of said composition;
  treating the tar sands with the composition to remove sand from the tar sands;
  forming an emulsion with oil contained in treated tar sands where the emulsion is oil in water emulsion; and
  de-emulsifying, under either energized or static conditions, the emulsion to release the oil as a separate phase from the water.

The composition in use has easily maintainable rheology and filtration control over a broad range of downhole operations.

DETAILED DESCRIPTION OF THE PREFERRED EMBODIMENTS

The following experiments are representative of the invention methodology and set forth experimental details in respect of the solution of the components of which the polymer system was made.

Experiment 1

An organic natural surfactant (Ho Flo) was evaluated in Kim Mud for its effect on tar sand. Testing was done at 30° C. It was found that Ho Flo at $0.1 L/m^3$ in Kim Mud improves the clumping of tar sand oil and prevents the stickiness of the oil to the testing container.

Experiment 2

As an extension of Experiment No. 1, further testing was performed on Ho Flo surfactant in Kim Mud regarding its ability to prevent the tar sand oil from sticking to steel. Lab results showed no apparent sticking of oil to steel in straight Kim Mud. Consequently, Ho Flo was not required.

Experiment 3

Solubility of two tar sand samples was tested in DMO 100 at room temperature (23° C.) and 35° C. At 23° C., DMO solubilized most of the tar leaving clean and freely moving sand. Temperature elevation to 35° C. resulted in higher solubility and complete removal of the tar from sand.

Experiment 4

Four lubricants were tested in Stable K (organic amine) mud to select the one with the least effect on tar sand. Testing was done at 23° C. and lubricant concentration of 1.5 and 3.0 $kg/m^3$.

EZ Drill and EZ Drill II (biodegradable organic oils) appeared to soften the tar sand, although no obvious sign of dissolvability of tar sand was noticed.

Tork-trol II and EZ Slide produced no change in the tar sand appearance.

Experiment 5

Stable K mud, Gel Chem mud, Stable K/K$_2$SO$_4$ mud and Polymer mud were evaluated for their ability to prevent blinding/sticking of bitumen from tar sands to screens. The testing temperature ranged from 5 to 20° C. and the screens used were 50, 70, 84 and 110 mesh. The Stable K mud was tested at 25 and 30° C. as well.

No blinding/sticking of bitumen to any screen occurred with any of the muds. The bitumen behaved the same in each mud.

Experiment 6

Various additives were tested in Polymer mud, Stable K mud and K$_2$SO$_4$/Gel mud to select the best combination that water wets the shaker screen and prevents sticking of tar sands to screen.

Drilltreat at 5 L/m$^3$ was the best additive improving the water wetting ability of all muds. K$_2$SO$_4$ worked similar in a Gel mud and less in Polymer mud. Q'Flow (Glycol) produced a softening of tar sands and dissolved some of the tar.

The second part of testing searched for an effective solvent of tar sands. Diesel, DMO 100 and HT-40N mixture of severely hydrotreated and hydrocracked base oil were tested at 23° C. The best solvent of tar from sand was Diesel with HT-40N being second best, DMO 100 was not found effective in removing the tar.

Experiments 7-9 represent lab work performed to develop a drilling fluid that solved the problems associated with drilling through tar sands. Thus, tar sand stickiness to equipment and shaker screen blinding was prevented with the new drilling fluid by removing the tar from the sand.

The idea behind the new drilling fluid was to formulate a direct emulsion where the external phase is water based and the internal phase is the organic solvent that removes the tar. Thus, the drilling fluid works by using the internal phase to clean the sand and keeping the removed oil in emulsion as fine drops. The emulsion is of loose structure and is readily broken or demulsified.

Experiment 7

The experiment relates to tests performed to select the organic solvent.

In order to find the best tar remover, over 50 products were tested at various concentrations. Q'Clean™ (a mixture of petroleum hydrocarbons) was selected as the best tar remover. Generally speaking, the product comprises hydrogenated heavy petroleum naphtha together with an organic solvent.

While Q'Clean™ was found as the tar remover and internal phase in the new drilling fluid, the external (continuous) phase selected was a Polymer/Stable K fluid.

No emulsifiers were required. Testing showed that emulsifiers had an adverse reaction by creating too small a drop of Q'Clean™ in the drilling fluid reducing its ability for cleaning the sand.

The new drilling fluid, Polymer/Stable K/Q'Clean™ was effective in removing the tar from the sand over a large range of temperatures, namely 5-30° C.

Experiment 8

This experiment sets forth work done to evaluate the performance of drilling fluid on a different sample of tar sands.

The Polymer/Stable K/Q'Clean™ fluid was tested at temperatures between 5 and 30° C. on tar sand from ECR 3B 102 Leismer LSD 2/13-16-76-6w4. Testing confirmed that Polymer/Stable K/Q'Clean™ fluid worked very well; the tar sand was cleaned at the temperature range indicated.

Experiment 9

This experiment related to developing the optimum formulation for the drilling fluid. The objective was to find the drilling fluid that dissolved and incorporated the tar, was least affected by contaminants and could be easily disposed of at the end of the well.

The project had 3 parts:
- designing and testing for the optimum formulation of drilling fluid with regards to tar removing ability;
- testing the likely contaminants on the fluid to see if any fluid formulation adjustment is required; and
- testing for emulsion breaking and oil phase separation for fluid disposal at the end of the well.

A new drilling fluid formulation containing Polymers/ sized Calcium Carbonate/Q'Clean™ was designed and tested. Various viscosifiers were tested at different concentrations with regards to mud rheology, cleaning ability and effect on emulsion breaking.

The following fluid formulation was selected fin its good rheology, fluid loss and tar sand cleaning ability:

| PolyTar ™ System | |
|---|---|
| Kelzan XCD (polysaccharide gum) | 0.75 kg/m$^3$ |
| Staflo R (sodium carboxymethyl cellulose) | 2 kg/m$^3$ |
| Starpak DP (modified starch) | 6 kg/m$^3$ |
| Calcarb 325 (calcium carbonate) | 10 kg/m$^3$ |
| Calcarb 0 (calcium carbonate) | 10 kg/m$^3$ |
| Caustic Soda | pH 10 |
| Q'Clean ™ (mixture of petroleum hydrocarbons) | 5% v/v |

Data illustrating the effectiveness will be presented herein after.

Contaminants testing on the drilling fluid showed minimal effects on its rheology and cleaning ability. Thus, gypsum and salt (NaCl) produced a moderate decrease in fluid rheology. The cleaning ability was affected only by salt; slightly reduced from 96% wt. to 80% wt. Solids contamination was simulated by adding 6% v/v tar sand to the drilling fluid already containing 5% v/v tar sand. The fluid behaved very well, cleaning 26% wt. tar sand off of the extra 6% v/v tar sand added.

After finding the fluid formulation and testing the contaminants, the environmental aspect of fluid development was reviewed. At the end of the well, the drilling fluid is a direct emulsion that contains as the internal phase (oil phase) the solvent (Q'Clean™) and the dissolved tar. In order to be able to dispose of the drilling fluid, the emulsion has to be broken and oil phase has to be separated and removed.

Breaking the emulsion of PolyTar™ System was attempted in three ways:
1. By making use of chemical demulsifiers. Eight demulsifiers were tested with no good results;
2. Making use of non-emulsifiers (two products) in the mud formulation to prevent the forming of a stable emulsion; and
3. Using a polymer breaker (four products, enzymes and bleach) to reduce the fluid viscosity and speed up the oil separation.

Q'Break™ (citric acid and amylase) (enzyme) at concentration of 2 kg/m$^3$ is the best product to help with emulsion breaking and oil separation from the drilling fluid. It produces a fast reduction in mud viscosity, the emulsion breaks easily and the oil (Q'Clean™+Tar) separates on top of fluid. After the treatment with Q'Break™ 2 kg/m$^3$ and 24 hours static at 22° C., the oil left in emulsion in the mud was only 0.47% v/v. Most of the oil phase (Q'Clean™ and dissolved Tar) was separated from the mud as a top layer and could be skimmed off.

Q'Break™ is an enzyme that works well at low temperatures, however, higher concentrations are recommended. Also, the product is safe and environmentally friendly.

A new approach to tar sand drilling resulted in development of a new drilling fluid addressing specific problems encountered in SAGD drilling projects.

The new drilling fluid was designed to solve the problem of tar sand stickiness by removing the tar from the sand. Lower toxicity and lower cost were pursued as attributes of the new drilling fluid designed.

Tables 1 and 2 set forth data and observations noted.

In respect of the drilling fluid composition, the following procedure was observed.

Various additives at various concentrations were added to water to examine the capacity to remove tar and clean the sand.

200 ml of the testing fluid received 20 g of tar sands.

The mixture was mixed on a Barnant mixer for 30 minutes at room temperature. The range of temperature for the testing was between 5° C. and 30° C.

Table 1 tabulates the data and observations noted

TABLE 1

Fluid Additive selection

| Additive & concentration in water | WTS, g | Visual observations |
|---|---|---|
| Blank (water) | 19.580 | Tar sands appeared unchanged. Fluid phase is clear and clean. |
| PAW 2315 @ 1% v/v | 19.660 | Tar sands appeared unchanged. Fluid phase is clear. |
| PAW 2315 @ 3% v/v | 20.125 | There is a very small amount of clean sand. The tar sand left is broken into smaller pieces; however, they remained hard. Fluid phase contains suspended small oil drops cleaned off the sand. |
| PAW 3900 @ 1% v/v | 20.138 | Similar to PAW 2315 @ 1% v/v. |
| PAW 3900 @ 3% v/v | 20.632 | There is a very small amount of clean sand. The tar sand left seems to remain in same size pieces; however, they remained hard. Fluid phase contains suspended small oil drops cleaned off the sand. |
| WAW 3917 @ 3% v/v | 19.883 | Similar to PAW 2315 @ 1% v/v. |
| WAO 3919U @ 3% v/v | 20.281 | Works well. Most sand is loose and fairly clean and the fluid phase is dark coloured. There are a few small soft pieces of tar sand left on the bottom of the beaker. |
| WAO 3919U @ 1% v/v | 20.002 | Similar to PAW 3919U @ 3% v/v. Just not quite as effective in cleaning the sand. |
| Beta Cyclod. @ 5 kg/m$^3$ | 20.420 | There is a very small amount of clean sand. The tar sand left seems to remain in same size pieces. Fluid phase has a thin oily film on top. There are lost of small tar sand particles. |
| Beta Cyclod. @ 10 kg/m$^3$ | 21.940 | No significant improvement. |
| Beta Cyclod. @ 20 kg/m$^3$ | 20.600 | No significant improvement. Noticeable is the fact that 20 kg/m$^3$ appears to be above its solubility. |
| Cut Clean @ 1% v/v | 20.283 | There is a large amount of clean sand and large pieces of tar sand left. The fluid phase is clear with no suspended solids. It has an oily film and a ring at the surface. |
| Cut Clean @ 2% v/v | 20.146 | The tar sand is completely broken down. On top of the sand layer there is a layer of large oil globules separated when agitation ceased. The fluid phase is cloudy, tan, with the odd suspended globule of oil and a thick layer of oil on top. |
| Cut Clean @ 3% v/v | 19.948 | The sand is completely entrapped in what appears to be a water in oil emulsion on the bottom of the beaker. This very viscous layer with a gel like consistency is easily moved with agitation. The fluid phase is similar to the one above. |
| Mudd Lite @ 2% v/v | 20.885 | Tar sands appeared unchanged. Fluid phase is tan in colour and has a layer of foam on top. |
| Mudd Lite @ 6% v/v | 19.962 | Similar to Mudd Lite @ 2% v/v. |
| DH6-115-2 | 19.802 | Tar sands appeared unchanged. Fluid phase is clear. |
| E X107 @ 3% v/v | 20.800 | Tar sands appeared unchanged. Fluid phase is clear. |
| E X1501 @ 3% v/v | 20.670 | There is a very small amount of clean sand. The tar sand left seems to remain in same size pieces. In water, this additive coagulated in a cream-yellow layer that separates on top of the fluid phase when at rest. |
| E XA923 @ 3% v/v | 20.791 | Tar sands appeared unchanged. Fluid phase is clear. |
| E X1033 @ 3% v/v | 19.703 | It broke the large tar sand pieces into small ones but there is no clean sand. |
| S DN82 @ 3% v/v | 20.799 | The sand is completely entrapped in what appears to be a water in oil emulsion on the bottom of the beaker. The liquid phase above this bottom layer is clean and clear. |
| E X1557 @ 3% v/v | 19.600 | ~75% of tar sand is completely clean. The rest of tar sand is in pieces looking unchanged. Under the microscope can see the oil in water emulsion that has a dark colour. There is a thin film of oil on top of fluid phase. |
| E X1557 @ 1% v/v | 20.557 | Similar to above test, just that on the sand grains are not quite as clean. |
| E X1557@ 5% v/v | | Same as @ 3% v/v. |
| E X 606 @ 3% v/v | 20.903 | There is a very small amount of clean sand. The tar sand left seems to remain in same size pieces. The fluid phase is light tan in colour and contains few tar particles suspended. |

TABLE 1-continued

| Additive & concentration In drilling fluid | WTS, g | Visual Observations |
|---|---|---|
| E X 109 @ 3% v/v | 19.282 | ~75% of tar sand is completely clean. The rest of tar sand is in pieces looking unchanged. Under the microscope can see the fluid as oil in water emulsion that has a dark colour. There is a thin film of oil on top of fluid phase. |
| E X 109 @ 5% v/v | 20.104 | Same as @ 3% v/v. |
| S DN71 @ 3% v/v | 20.120 | ~50% of sand is partially clean and the other 50% is left unchanged in tar sand pieces. The fluid phase is oil in water emulsion. |
| S DN120 @ 3% v/v | 20.322 | There is less than 1% of clean sand. The tar sand left seems to remain in same size pieces. The fluid phase is clean and clear. |
| S DN114 @ 3% v/v | 19.820 | As above |
| S DN121 @ 3% v/v | 20.026 | ~15-20% of sand is clean. The rest appears unchanged. The fluid phase is milky-gray in colour. |
| S DN87 @ 3% v/v | 20.735 | ~75% of sand is completely clean. The rest of tar sand is in fairly small pieces. Under the microscope can see the fluid as oil in water emulsion that has a dark colour. |
| S DN87 @ 3% v/v | 20.610 | Some improvement from 3% v/v, however, there still are a few tar sand pieces left. |
| S DN76 @ 3% v/v | 21.028 | Most of tar sand (~75%) is a flowing sludge on the bottom of beaker. There are a few pieces of tar sand |
| DT78 @ 3% v/v | 20.782 | ~80-90% of sand is fairly clean but the oil is not emulsioned and just lays and sticks to the sand layer. |
| DG56 @ 3% v/v | 20.980 | There is less than 1% of clean sand. The tar sand left seems to remain in same size pieces. The fluid phase is clean and clear. |
| M38 @ 3% v/v | 20.853 | ~50% of sand is fairly clean and the other 50% is left small tar sand pieces. The fluid phase is oil in water emulsion. |
| M150 @ 3% v/v | 19.320 | ~50% of loose sand, dark, still coated with oil. The rest of tar sand seems to remain in same size pieces. The fluid phase is dark |
| M192 @ 3% v/v | 20.962 | ~75% of tar sand is completely clean. The rest of tar sand is in pieces looking unchanged. Under the microscope can see the oil in water emulsion that has a dark colour. There is a thin film of oil on top. |
| M192 @ 5% v/v | 20.042 | Some improvement from 3% v/v, however there still are a few tar sand pieces left. |
| M187 @ 3% v/v | 20.178 | ~15-20% of sand is clean. The rest appears unchanged. The fluid phase is tan in colour. |
| Solvent @ 5% v/v | 19.314 | ~80% of sand is loose, free flowing but still covered by oil material |
| P2-181-9 @ 1% v/v | 20.386 | ~50% of sand is fairly clean and the other 50% is left small tar sand pieces. The fluid phase is an emulsion. |
| P2-181-11B @ 1% v/v | 20.408 | ~15-20% of sand is clean. The rest appears unchanged. |
| P2-181-15B @ 1% v/v | 20.560 | ~50% of sand is fairly clean and the other 50% is left small tar sand pieces. The fluid phase is an emulsion. |
| P2-181-19B @ 1% v/v | 21.300 | Complete balling of tar sands that became soft (it incorporated water) and sticky. |
| P2-181-16B @ 1% v/v | 21.107 | ~15-20% of sand is clean. The rest appears unchanged. |
| P2-181-21B @ 1% v/v | 20.144 | ~15-20% of sand is clean. The rest of tar sand is soft and sticky. |
| Travis 2095 @ 1% v/v | 21.893 | ~5% of sand is clean. The rest appears unchanged. |
| Travis 2704 @ 1% v/v | 20.982 | Tar sands appeared unchanged. Fluid phase is clear. |

Drilling Fluid selection - Polymer/Stable K system

| Additive & concentration In drilling fluid | WTS, g | Visual Observations |
|---|---|---|
| Blank (Poly./Stable K) | | |
| E XZ1557 @ 1% v/v | 20.634 | Tar sands appeared unchanged. Fluid phase contains small tar particles suspended. |
| E XZ1557 @ 3% v/v | 20.049 | ~40% of tar sand remained on the 30 mesh screen as small and large pieces. Dark fluid phase of oil in water emulsion. |
| Xylene/Isopropanol @ 3% v/v | 20.250 | Tar sands appeared unchanged. Fluid phase contains small tar particles suspended. |
| Diesel @ 3% v/v | 20.975 | There is a small amount of loose sand. Tar sand left remained in same size pieces. Fluid phase is emulsion with suspended tar particles. |
| Diesel @ 10% v/v | 19.580 | Most solids are loose, still covered by oil and flowing. |
| Diesel @ 10% v/v + XZ1557 @ 3% v/v | 20.078 | Tar sands appeared unchanged. The oil is emulsioned as extremely small drops that could not contact the tar sands and is fairly clean. |
| BDD100 @ 3% v/v | 20.980 | Tar sands appeared unchanged. Fluid phase contains small tar particles suspended. |
| BDS300 @ 3% v/v | 19.047 | Tar sands appeared unchanged. Fluid phase contains small tar particles suspended. |
| BDS200 @ 3% v/v | 20.382 | Tar sands appeared unchanged. Fluid phase contains small tar particles suspended. |
| E X1577 @ 3% v/v | 20.490 | Tar sands appeared unchanged. Fluid phase contains small tar particles suspended. |
| E X1421 @ 3% v/v | 20.195 | It produced rapid precipitation-coagulation of the Polymer/Stable K system. |
| E X1262 @ 3% v/v | 20.728 | Tar sands appeared unchanged. Fluid phase contains small tar particles suspended. |
| E X1667 @ 3% v/v | 20.801 | Tar sands appeared unchanged. Fluid phase contains small tar particles suspended. |
| DWB-1-5 @ 3% v/v | 20.221 | Tar sands appeared unchanged. Fluid phase contains small tar particles suspended. |
| DWB-1-9 @ 3% v/v | 20.453 | Tar sands appeared unchanged. Fluid phase contains small tar particles suspended. |
| DWB-1-6 @ 3% v/v | 20.735 | Tar sands appeared unchanged. Fluid phase contains small tar particles suspended. |
| DWB-1-7 @ 3% v/v | 20.466 | Tar sands appeared unchanged. Fluid phase contains small tar particles suspended. |
| DWB-1-8 @ 3% v/v | 19.952 | Tar sands appeared unchanged. Fluid phase contains small tar particles suspended. |
| Solvent @ 3% v/v + XZ1557 @ 1% v/v | 20.942 | Some clean sand grains seen under microscope. Most tar sand is left uncleaned as small pieces. |
| Solvent @ 10% v/v | 20.631 | Cleaned most of sand. Mixture is poured on a 30 mesh screen. ~10% of tar sand remained on the screen. Can see the clear - clean sand grains suspended in the fluid and the dark oil drops. Fluid phase is very dark due to the dissolved oil. |
| Solvent @ 10% v/v + Rev Dust 4% v/v | 20.17 | <5% of tar sand left on the 30 mesh screen as small and soft pieces. Dark fluid phase containing almost completely clean sand. |
| Solvent @ 7% v/v + Rev Dust 4% v/v | 20.353 | ~5-7% of tar sand left on the 30 mesh screen. The rest as above. |

TABLE 1-continued

| | | |
|---|---|---|
| M192 @ 5% v/v | 20.824 | ~70% of tar sand remained on the 30 mesh screen as small and large pieces. Dark fluid phase. |
| Amodrill 1400 @ 10% v/v | 20.560 | ~30% of tar sand remained on the 30 mesh screen as small and large pieces. Dark fluid phase. |
| Emulam D30 @ 5% v/v | 20.106 | ~100% of tar sand remained on the 30 mesh screen as unchanged small and large pieces. |
| Cut Clean @ 5% v/v | 20.929 | ~30% of tar sand remained on the 30 mesh screen as small and large pieces. Dark fluid phase. |

Drilling Fluid selection - Gel Chem system

| Additive & concentration in drilling fluid | WTS, g | Visual Observations |
|---|---|---|
| Blank (Gel Chem sys.) | 20.651 | Tar sands appeared unchanged. Fluid phase contains small tar particles suspended. |
| Tar Solvent @ 10% v/v | 20.920 | ~20% of tar sand remained on the 30 mesh screen as small and large pieces. Dark fluid phase with fairly clean sand suspended. |
| Tar Solvent @ 10% v/v + Rev Dust @ 4% v/v | 20.700 | As above. |

| Additive concentration and mixture temperature | WTS, g | Visual Observations |
|---|---|---|
| Tar Solvent @ 20% v/v-5° C. | 20.878 | ~10% of tar sand left on the 30 mesh screen as small and soft pieces. Dark fluid phase containing almost completely sand. |
| Tar Solvent @ 10% v/v-10° C. | 19.968 | ~50% of tar sand left on the 30 mesh screen as small and soft pieces. Dark fluid phase. |
| Tar Solvent @ 15% v/v-10° C. | 20.261 | ~20% of tar sand left on the 30 mesh screen as small and soft pieces. Dark fluid phase. |
| Tar Solvent @ 20% v/v-10° C. | 20.325 | ~10% of tar sand left on the 30 mesh screen as small and soft pieces. Dark fluid phase containing almost completely sand. |
| Tar Solvent @ 15% v/v-15° C. | 20.380 | ~20% of tar sand left on the 30 mesh screen as small and soft pieces. Dark fluid phase. |
| Tar Solvent @ 20% v/v-15° C. | 20.375 | ~10% of tar sand left on the 30 mesh screen as small and soft pieces. Dark fluid phase containing almost completely sand. |
| Tar Solvent @ 10% v/v-20° C. | 20.713 | ~5% of tar sand left on the 30 mesh screen as small and soft pieces. Dark fluid phase containing almost completely sand. |
| Tar Solvent @ 10% v/v-25° C. | 20.532 | As above |
| Tar Solvent @ 10% v/v-30° C. | 20.342 | ~3% of tar sand left on the 30 mesh screen as small and soft pieces. Dark fluid phase containing almost completely sand. |

In connection with the fluid testing, the following procedure was involved.

200 mL of drilling fluid, discussed herein previously, was placed in a beaker to which 20 g of Tar Sands was added. This was mixed on a Barnant mixer for 30 minutes at room temperature. The mixture was passed through a 30 mesh screen.

The test was repeated in a temperature range of between 5 and 30° C.

TABLE 2

Tar sands from 397.4 m depth - Drilling fluid testing

| Solvent concentration in drilling fluid and test temperature | WTS, g | Visual Observations |
|---|---|---|
| 15% v/v Solvent & 5° C. | 20.450 | ~15-20% of tar sand left on the 30 mesh screen (small and large pieces) and a significant amount of clean large sand grains (~3 mm diameter). Dark fluid phase containing completely clean sand |
| 20% v/v Solvent & 5° C. | 19.781 | ~10% of tar sand left on the 30 mesh screen (small and large pieces) and a significant amount of clean large sand grains (~3 mm diameter). Dark fluid phase containing completely clean sand |
| 10% v/v Solvent & 10° C. | 19.968 | ~20% of tar sand left on the 30 mesh screen as various size pieces. The rest is as above. |
| 15% v/v Solvent & 10° C. | 20.261 | ~15% of tar sand left on the 30 mesh screen as various size pieces. The rest is as above. |
| 20% v/v Solvent & 10° C. | 20.371 | ~7-10% of tar sand left on the 30 mesh screen as small and soft pieces. The rest is as above. |
| 10% v/v Solvent & 15° C. | 20.482 | ~15% of tar sand left on the 30 mesh screen as various size pieces. The rest is as above. |

TABLE 2-continued

Tar sands from 397.4 m depth - Drilling fluid testing

| Solvent concentration in drilling fluid and test temperature | WTS, g | Visual Observations |
|---|---|---|
| 15% v/v Solvent & 15° C. | 20.037 | ~15% of tar sand left on the 30 mesh screen as various size pieces. The rest is as above. |
| 20% v/v Solvent & 20° C. | 20.389 | ~3% of tar sand left on the 30 mesh screen as small size pieces. The rest is as above. |
| 0% v/v Solvent & 20° C. | 20.253 | ~80% of tar sand left on the 30 mesh screen as small size pieces. The solids that passed through the screen are suspended in the fluid and consist of tar sands and heavy oil particles. |
| 10% v/v Solvent & 20° C. | 20.135 | ~7-10% of tar sand left on the 30 mesh screen (small and large pieces) and a significant amount of clean large sand grains (~3 mm diameter). Dark fluid phase containing completely clean sand |
| 10% v/v Solvent & 25° C. | 20.185 | ~5% of tar sand left on the 30 mesh screen as various size pieces. The rest is as above. |
| 10% v/v Solvent & 30° C. | 20.019 | No tar sand left on the 30 mesh screen. The only solids left on screen are the clean large sand grains (~3 mm diameter). Dark fluid phase containing completely clean sand. |

Note:
WTS—weight of tar sands.

In all the above tests where the new drilling fluid was used (all except sample with 0% v/v Solvent), the fluid phase was an oil in water emulsion. The oil drops had a good size (not too small, not too big) and were dark colored due to the tar having been stripped off the sand.

The core sample of tar sands used to perform the above testing showed very small pieces of completely clean solids (shale like). These clean solids were avoided when tar sand samples were removed from the core during testing.

Tables 3 through 22 tabulate data for different polymer systems together with specific listing for each.

As set forth herein previously, having listed the necessary components for the polymer system, ranges for effectiveness were required for determination. The following two polymer systems were tested

| Polymer System A | | Polymer System B | |
|---|---|---|---|
| Additive | Concentration | Additive | Concentration |
| Kelzan XCD ® | 1.5 kg/m$^3$ | Kelzan XCD ® | 2 kg/m$^3$ |
| Staflo ® R | 2 kg/m$^3$ | Staflo ® R | 2 kg/m$^3$ |
| Starpak ® DP | 6 kg/m$^3$ | Starpak ® DP | 6 kg/m$^3$ |
| Calcarb 325 | 10 kg/m$^3$ | Calcarb 325 | 10 kg/m$^3$ |
| Calcarb 0 | 10 kg/m$^3$ | Calcarb 0 | 10 kg/m$^3$ |
| Caustic Soda | pH 10 | Caustic Soda | pH 10 |

Q/C = Q'Clean

TABLE 3

Mud Formulation Testing - Rheology and API fluid loss at 23° C.

| Formulation | 600 rpm | 300 rpm | 200 rpm | 100 rpm | 60 rpm | 30 rpm | 6 rpm | 3 rpm | Gels, Pa | PV, cP | YP, Pa | FL, mL |
|---|---|---|---|---|---|---|---|---|---|---|---|---|
| A | 65 | 47 | 40 | 30 | 23 | 17 | 8 | 7 | 3.5/4.0 | 18 | 14.5 | 13.8 |
| A + 2.5% Q'C | 66 | 49 | 41 | 30 | 24 | 18 | 8 | 7 | 3.5/4.0 | 18 | 16.0 | 12.0 |
| A + 5% Q'C | 70 | 52 | 43 | 32 | 25 | 18 | 9 | 8 | 4.0/4.5 | 18 | 17.0 | 9.8 |
| A + 10% Q'C | 71 | 52 | 43 | 32 | 25 | 19 | 9 | 8 | 4.5/4.5 | 19 | 16.5 | 8.3 |
| B | 101 | 78 | 67 | 48 | 40 | 30 | 12 | 10 | 4.5/5.0 | 23 | 27.5 | 11.2 |
| B + 2.5% Q'C | 105 | 81 | 69 | 52 | 41 | 30 | 13 | 11 | 5.0/5.5 | 24 | 28.5 | 11.0 |
| B + 5% Q'C | 110 | 84 | 72 | 54 | 43 | 31 | 14 | 11 | 5.5/5.5 | 26 | 29.0 | 12.4 |
| B + 10% Q'C | 115 | 89 | 75 | 57 | 46 | 33 | 15 | 12 | 6.0/6.0 | 26 | 31.5 | 9.0 |

TABLE 4

Tar Sand Cleaning at 23° C.

| Fluid Formulation | Tar sand | Dish | Residue & Dish | Residue >30 mesh | Tar sand cleaned, % wt. |
|---|---|---|---|---|---|
| A | 27.131 | 1.060 | 23.013 | 21.953 | 19.1 |
| A + 2.5% Q'C | 27.122 | 1.000 | 7.890 | 6.890 | 74.6 |
| A + 5% Q'C | 27.300 | 1.033 | 2.112 | 1.079 | 96.0 |
| A + 10% Q'C | 27.644 | 1.004 | 1.671 | 0.667 | 97.6 |
| B | 27.233 | 1.039 | 23.474 | 22.435 | 17.6 |
| B + 2.5% Q'C | 27.473 | 1.038 | 8.375 | 7.337 | 73.3 |
| B + 5% Q'C | 27.457 | 1.031 | 2.718 | 1.687 | 93.9 |
| B + 10% Q'C | 27.295 | 1.038 | 2.273 | 1.235 | 95.5 |

TABLE 5

Contaminants Testing on the PolyTar System (PTS = A + 5% Q'C). Rheology at 23° C.

| Sample | 600 rpm | 300 rpm | 200 rpm | 100 rpm | 60 rpm | 30 rpm | 6 rpm | 3 rpm | Gels, Pa | PV, cP | YP, Pa |
|---|---|---|---|---|---|---|---|---|---|---|---|
| PTS | 64 | 47 | 39 | 28 | 23 | 16 | 8 | 6 | 3.0/3.5 | 17 | 15 |
| PTS + 5 kg/m$^3$ Gypsum | 48 | 35 | 29 | 20 | 16 | 12 | 5 | 4 | 2.5/2.5 | 13 | 11 |
| PTS + 1 kg/m$^3$ Lime | 64 | 47 | 39 | 28 | 23 | 16 | 8 | 6 | 3.0/3.5 | 17 | 15 |
| PTS + NaOH for pH12 | 62 | 46 | 38 | 28 | 22 | 15 | 7 | 5 | 3.0/3.0 | 16 | 15 |
| PTS + 5 kg/m$^3$ NaCl | 56 | 41 | 34 | 24 | 19 | 13 | 6 | 5 | 2.5/3.0 | 15 | 13 |
| PTS + 10 kg/m$^3$ NaCl | 54 | 39 | 32 | 23 | 18 | 13 | 6 | 5 | 2.5/3.0 | 15 | 12 |
| PTS + 20 kg/m$^3$ NaCl | 49 | 35 | 29 | 21 | 16 | 11 | 5 | 4 | 2.0/2.5 | 14 | 10.5 |
| PTS + 6% vol. Tar Sand | 72 | 52 | 42 | 31 | 24 | 18 | 9 | 6 | 3.0/3.5 | 20 | 16 |

TABLE 6

Contaminants Testing on the PolyTar System (PTS). API fluid loss

| Sample | FL, mL |
|---|---|
| PTS | 10 |
| PTS + 5 kg/m$^3$ Gypsum | 9.5 |
| PTS + 1 kg/m$^3$ Lime | 10 |
| PTS + 5 kg/m$^3$ NaCl | 9.5 |
| PTS + 10 kg/m$^3$ NaCl | 9 |
| PTS + 20 kg/m$^3$ NaCl | 8 |
| PTS + 6% vol. Tar Sand | 6 |

TABLE 7

Tar Sand Cleaning in contaminated fluid at 23° C. - 5% vol. Tar Sand in the Fluid Sample

| Fluid Sample | Tar sand | Dish | Residue & Dish | Residue >30 mesh | Tar sand cleaned, % wt. |
|---|---|---|---|---|---|
| PolyTar System (PTS) | 27.300 | 1.033 | 2.112 | 1.079 | 96.0 |
| PTS + 5 kg/m$^3$ Gypsum | 27.611 | 1.002 | 2.882 | 1.880 | 93.2 |
| PTS + 1 kg/m$^3$ Lime | 27.273 | 1.027 | 2.527 | 1.500 | 94.5 |
| PTS + 5 kg/m$^3$ NaCl | 27.458 | 0.998 | 5.720 | 4.722 | 82.8 |
| PTS + 10 kg/m$^3$ NaCl | 27.397 | 1.004 | 6.278 | 5.274 | 80.7 |
| PTS + 20 kg/m$^3$ NaCl | 27.315 | 1.004 | 6.425 | 5.421 | 80.2 |
| PTS + 6% vol. Tar Sand | 27.289 | 1.020 | 21.099 | 20.079 | 26.4 |

TABLE 8

PolyTar System/Dissolved Tar Emulsion Breaking at 23° C. - Removal of dissolved tar.

| Demulsifier | Conc., L/m$^3$ | Notes on emulsion behaviour |
|---|---|---|
| None | | Oil drops are small but visible with naked eye. The oil in water emulsion is stable. it does not break in over 8 hours. After 24 hours there is a very small amount of free oil on top of fluid. |
| T2001 | 1<br>2 | Oil drops are not visible with naked eye. Under the microscope they look 2-3 times smaller than they were initially. The oil in water emulsion became more stable. It does not break in over 24 hours. There is no free oil on top of fluid. |
| T2005 | 1<br>2 | Oil drops are not visible with naked eye. Under the microscope they look 2-3 times smaller than they were initially. The oil in water emulsion became more stable. It does not break in over 24 hours. There is no free oil on top of fluid. |
| T2007 | 1<br>2 | Oil drops are not visible with naked eye. Under the microscope they look 2-3 times smaller than they were initially. The oil in water emulsion became more stable. It does not break in over 24 hours. There is no free oil on top of fluid. |
| T2508 | 1<br>2 | Oil drops are not visible with naked eye. Under the microscope they look 2-3 times smaller than they were initially. The oil in water emulsion became more stable. It does not break in over 24 hours. There is no free oil on top of fluid. |
| NE 125 | 0.5<br>1<br>2 | Oil drops are small but visible with naked eye. The oil in water emulsion is stable. It does not break in over 8 hours. After 24 hours there is a very small amount of free oil on top of fluid. |
| NE 723 | 0.5<br>1<br>2 | Oil drops are small but visible with naked eye. The oil in water emulsion is stable. It does not break in over 8 hours. After 24 hours there is a very small amount of free oil on top of fluid. |

TABLE 9

PolyTar System/Dissolved Tar Emulsion - Preventing forming a stable emulsion using non-emulsifiers (23° C.).

| Non-emulsifier | Conc., L/m$^3$ | Notes on emulsion behaviour |
|---|---|---|
| None | | Oil drops are small but visible with naked eye. The oil in water emulsion is stable. It does not break in over 8 hours. After 24 hours there is a very small amount of free oil on top of fluid. |
| NE 125 | 1<br>2 | Oil drops are not visible with naked eye. Under the microscope they look 2-3 times smaller than they were initially. The oil in water emulsion became more stable. It does not break in over 24 hours. There is no free oil on top of fluid. |
| NE 723 | 1<br>2 | Oil drops are not visible with naked eye. Under the microscope they look 2-3 times smaller than they were initially. The oil in water emulsion became more stable. It does not break in over 24 hours. There is no free oil on top of fluid. |

TABLE 10

Tar Sand Cleaning at 23° C. - PTS cleaning ability when using non-emulsifiers at 1 L/m$^3$.

| | Weight, g | | | | Tar sand |
|---|---|---|---|---|---|
| Non-emulsifier | Tar sand | Dish | Residue & Dish | Residue >30 mesh | cleaned, % wt. |
| NE 125 | 27.655 | 1.036 | 13.601 | 12.565 | 54.6 |
| NE 723 | 27.504 | 1.000 | 8.898 | 8.898 | 67.6 |

TABLE 11

Viscosifier selection to prevent forming a stable PolyTar System/Dissolved Tar Emulsion - Polymer (Viscosifier) Testing in PolyTar System - Rheology at 23° C.

| Viscosifier | kg/m$^3$ | 600 rpm | 300 rpm | 200 rpm | 100 rpm | 60 rpm | 30 rpm | 6 rpm | 3 rpm | Gels, Pa | PV, cP | YP, Pa |
|---|---|---|---|---|---|---|---|---|---|---|---|---|
| Kelzan XCD | 1.5 | 70 | 52 | 43 | 32 | 25 | 18 | 9 | 8 | 4/4.5 | 18 | 17 |
| Biovis | 1.5 | 54 | 37 | 29 | 18 | 13 | 8 | 3 | 2 | 1/1.5 | 27 | 5 |
| Biovis | 3 | 73 | 53 | 44 | 33 | 27 | 20 | 10 | 8 | 4.5/6.5 | 20 | 16.5 |
| Geovis XT | 1.5 | 71 | 51 | 42 | 32 | 25 | 15 | 10 | 9 | 5/7 | 20 | 15.5 |

TABLE 11-continued

Viscosifier selection to prevent forming a stable PolyTar System/
Dissolved Tar Emulsion - Polymer (Viscosifier)
Testing in PolyTar System - Rheology at 23° C.

| Viscosifier | kg/m³ | 600 rpm | 300 rpm | 200 rpm | 100 rpm | 60 rpm | 30 rpm | 6 rpm | 3 rpm | Gels, Pa | PV, cP | YP, Pa |
|---|---|---|---|---|---|---|---|---|---|---|---|---|
| HEC | 1.5 | 92 | 70 | 58 | 43 | 33 | 23 | 9 | 7 | 3.5/3.5 | 22 | 24 |
| Xanvis | 1.5 | 60 | 43 | 36 | 26 | 20 | 15 | 7 | 6 | 3/3.5 | 17 | 13 |

TABLE 12

Tar Sand Cleaning at 23° C. - PTS cleaning ability
when using viscosifiers and concentrations above mentioned.

| Viscosifier | Tar sand | Dish | Residue & Dish | Residue >30 mesh | Tar sand cleaned, % wt. |
|---|---|---|---|---|---|
| Kelzan XCD | 27.300 | 1.033 | 2.112 | 1.079 | 96.0 |
| Biovis - 1.5 | 27.345 | 1.009 | 5.076 | 4.067 | 85.1 |
| Biovis - 3 | 27.474 | 1.033 | 3.398 | 2.365 | 91.4 |
| Geovis XT | 27.343 | 1.020 | 4.354 | 3.334 | 87.8 |
| HEC | 27.456 | 1.031 | 9.140 | 8.109 | 70.5 |
| Xanvis | 27.333 | 1.002 | 4.638 | 3.636 | 86.7 |

TABLE 13

Viscosifier selection to prevent forming a
stable PolyTar System/Dissolved Tar
Emulsion - Testing at 23° C.

| Viscosifier | Conc., kg/m³ | Notes on emulsion behaviour within 6 hours |
|---|---|---|
| Kelzan XCD | 1.5 | The oil in water emulsion is less stable. Emulsion is slowly breaking. There is a bit of free oil on top of fluid after 6 hours. This sample looks the best. |
| Biovis | 3 | The oil in water emulsion is stable. No sign of emulsion breaking in 6 hours. There is no free oil on top of fluid. |
| Geovis XT | 1.5 | The oil in water emulsion is stable. No sign of emulsion breaking in 6 hours. There is no free oil on top of fluid. |
| HEC | 1.5 | The oil in water emulsion is stable. No sign of emulsion breaking in 6 hours. There is no free oil on top of fluid. |
| Xanvis | 1.5 | The oil in water emulsion appears less stable. Emulsion is slowly breaking. There are traces of free oil on top of fluid after 6 hours. This sample is the next best. |

TABLE 14

Polymer Breaker Testing on PTS containing Kelzan
XCD @ 1.5 kg/m³ - Rheology
after 24 hours @ 23° C.

| Breaker & conc., kg/m³ | 600 rpm | 300 rpm | 200 rpm | 100 rpm | 60 rpm | 30 rpm | 6 rpm | 3 rpm | Gels, Pa | PV, cP | YP, Pa |
|---|---|---|---|---|---|---|---|---|---|---|---|
| None | 66 | 48 | 41 | 30 | 24 | 17 | 8 | 6 | 3/3.5 | 18 | 15 |
| Q'Break, 2 | 41 | 28 | 22 | 15 | 11 | 8 | 4 | 3 | 1.5/1.5 | 13 | 7.5 |
| Chembreak HC, 3 | 41 | 27 | 22 | 15 | 11 | 8 | 3 | 2 | 1/1.5 | 14 | 6.5 |
| Chembreak EBS, 3 | 52 | 38 | 31 | 22 | 17 | 12 | 6 | 5 | 2.5/3 | 14 | 12 |
| Chembreak EBS, 3* | 48 | 34 | 28 | 20 | 16 | 11 | 5 | 4 | 2/2 | 14 | 10 |
| Bleach, 5 L/m³ | 26 | 17 | 13 | 9 | 7 | 5 | 2 | 2 | 1/1 | 9 | 4 |

Note:
*sample contains 5,000 ppm Cl as NaCl.

An adjusted polymer system was then reviewed.

Adjusted PolyTar System formulation (less viscosifier)

| Additive | Concentration | Additive | Concentration |
|---|---|---|---|
| Kelzan XCD ® | .75 kg/m³ | Xanvis ® | 1 kg/m³ |
| Staflo ® R | 2 kg/m³ | Staflo ® R | 2 kg/m³ |
| Starpak ® DP | 6 kg/m³ | Starpak ® DP | 6 kg/m³ |
| Calcarb 325 | 10 kg/m³ | Calcarb 325 | 10 kg/m³ |
| Calcarb 0 | 10 kg/m³ | Calcarb 0 | 10 kg/m³ |

-continued

| Adjusted PolyTar System formulation (less viscosifier) | | | |
|---|---|---|---|
| Additive | Concentration | Additive | Concentration |
| Caustic Soda | pH 10 | Caustic Soda | pH 10 |
| Q' Clean | 5% vol. | Q' Clean | 5% vol. |

TABLE 15

PolyTar System/Dissolved Tar Emulsion (5% vol. Tar Sand in the mud) - Rheology at 23° C.

| Viscosifier | kg/m³ | 600 rpm | 300 rpm | 200 rpm | 100 rpm | 60 rpm | 30 rpm | 6 rpm | 3 rpm | Gels, Pa | PV, cP | YP, Pa |
|---|---|---|---|---|---|---|---|---|---|---|---|---|
| Kelzan XCD | 0.75 | 58 | 42 | 34 | 24 | 18 | 12 | 5 | 4 | 2/2 | 16 | 13 |
| Xanvis | 1 | 62 | 46 | 38 | 27 | 21 | 15 | 6 | 5 | 2.5/3 | 16 | 15 |

TABLE 16

Tar Sand Cleaning at 23° C. - PTS cleaning ability when using viscosifiers and concentrations above mentioned.

| Viscosifier | Weight, g | | | | Tar sand cleaned, % wt. |
|---|---|---|---|---|---|
| | Tar sand | Dish | Residue & Dish | Residue >30 mesh | |
| Kelzan XCD | 27.397 | 1.059 | 4.116 | 3.057 | 88.8 |
| Xanvis | 27.512 | 1.040 | 5.076 | 4.378 | 84.1 |

TABLE 17

Polymer Breaker Testing on PTS containing Kelzan XCD @ 0.75 kg/m³ - Rheology after 2 hours @ 23° C.

| Breaker & conc., kg/m³ | 600 rpm | 300 rpm | 200 rpm | 100 rpm | 60 rpm | 30 rpm | 6 rpm | 3 rpm | Gels, Pa | PV, cP | YP, Pa |
|---|---|---|---|---|---|---|---|---|---|---|---|
| None | 58 | 42 | 34 | 24 | 18 | 12 | 5 | 4 | 2/2 | 16 | 13 |
| Q'Break, 2 | 41 | 25 | 19 | 12 | 9 | 5 | 2 | 2 | 1/1 | 16 | 4.5 |
| Chembreak HC, 3 | 27 | 17 | 13 | 8 | 5 | 4 | 1 | 1 | 0.5/0.5 | 10 | 3.5 |
| Bleach, 5 L/m³ | 56 | 36 | 27 | 17 | 13 | 8 | 3 | 2 | 1/1 | 20 | 8 |

TABLE 18

Polymer Breaker Testing on PTS containing Xanvis @ 1 kg/m³ - Rheology after 2 hours @ 23° C.

| Breaker & conc., kg/m³ | 600 rpm | 300 rpm | 200 rpm | 100 rpm | 60 rpm | 30 rpm | 6 rpm | 3 rpm | Gels, Pa | PV, cP | YP, Pa |
|---|---|---|---|---|---|---|---|---|---|---|---|
| None | 62 | 46 | 38 | 27 | 21 | 15 | 6 | 5 | 2.5/3 | 16 | 15 |
| Q'Break, 2 | 44 | 28 | 22 | 14 | 10 | 7 | 3 | 2 | 1/1 | 16 | 6 |
| Chembreak HC, 3 | 41 | 28 | 22 | 15 | 11 | 7 | 3 | 2 | 1/1 | 13 | 7.5 |
| Bleach, 5 L/m³ | 69 | 47 | 38 | 25 | 19 | 13 | 5 | 4 | 2/2.5 | 22 | 12.5 |

TABLE 19

Retort Test on PolyTar System/Dissolved Tar Emulsion (5% vol. Tar Sand in the mud)

| Sample from ½ height of emulsion in 250 mL graduated cylinder after 24 hours | Retort content, % v/v | | | Total Hydrocarbons Content (Core Labs), % v/v |
|---|---|---|---|---|
| | Oil | Water | Solids | |
| Blank (no ECA) | 5 | 94 | 1 | |
| Q'Break 2 kg/m3 | 2 | 97 | 1 | 0.473 |
| Q'Break 4 kg/m3 | 1 | 99 | 0 | 0.492 |

TABLE 20

Q'Break Testing at 23° C. (room) on PTS containing Kelzan XCD @ 0.75 kg/m3 - Rheology @ 23° C.

| Q'Break kg/m$^3$ | 600 rpm | 300 rpm | 200 rpm | 100 rpm | 60 rpm | 30 rpm | 6 rpm | 3 rpm | Gels, Pa | PV, cP | YP, Pa |
|---|---|---|---|---|---|---|---|---|---|---|---|
| None | 58 | 42 | 34 | 24 | 18 | 12 | 5 | 4 | 2/2 | 16 | 13 |
| 2 kg/m$^3$, after 2 hours | 40 | 26 | 20 | 13 | 9 | 6 | 2 | 2 | 1/1 | 14 | 6 |
| 2 kg/m$^3$, after 6 hours | 36 | 23 | 18 | 11 | 8 | 5 | 2 | 1 | 0.5/0.5 | 13 | 5 |
| 2 kg/m$^3$, after 24 hours | 31 | 20 | 15 | 10 | 7 | 4 | 1 | 1 | 0.5/0.5 | 11 | 4.5 |
| 4 kg/m$^3$, after 2 hours | 39 | 25 | 20 | 13 | 9 | 6 | 2 | 2 | 1/1 | 14 | 5.5 |
| 4 kg/m$^3$, after 6 hours | 25 | 16 | 12 | 7 | 5 | 3 | 1 | 1 | 0.5/0.5 | 9 | 3.5 |
| 4 kg/m$^3$, after 24 hours | 20 | 12 | 9 | 6 | 4 | 3 | 1 | 1 | 0.5/0.5 | 8 | 2 |

TABLE 21

Q'Break Testing at 3° C. (fridge) on PTS containing Kelzan XCD @ 0.75 kg/m3 - Rheology @ 3° C.

| Q'Break, kg/m$^3$ | 600 rpm | 300 rpm | 200 rpm | 100 rpm | 60 rpm | 30 rpm | 6 rpm | 3 rpm | Gels, Pa | PV, cP | YP, Pa |
|---|---|---|---|---|---|---|---|---|---|---|---|
| None | 74 | 52 | 43 | 30 | 23 | 16 | 7 | 5 | 2.5/3 | 22 | 15 |
| 2 kg/m$^3$, after 3 hours | 54 | 35 | 27 | 17 | 12 | 8 | 3 | 2 | 1/1 | 19 | 8 |
| 2 kg/m$^3$, after 6 hours | 40 | 25 | 19 | 12 | 9 | 5 | 2 | 1 | 0.5/0.5 | 15 | 5 |
| 4 kg/m$^3$, after 2 hours | 47 | 31 | 23 | 15 | 11 | 7 | 2 | 2 | 1/1 | 16 | 7.5 |
| 4 kg/m$^3$, after 6 hours | 38 | 24 | 17 | 11 | 8 | 5 | 2 | 1 | 0.5/0.5 | 14 | 5 |

Overall the polymer system containing the Kelzan XCD® in a concentration of 0.75 kg/m$^3$ provided preferred rheology, fluid loss and cleansing of tar sands.

FIELD EXAMPLE

In January/February of 2004, six wells were drilled which used the PolyTar drilling fluid system in part of the drilling operation. The wells, located in 84-11 W4 in Alberta Canada, were horizontal in nature with the intermediate and main horizontal tar sands drilled with Polytar. The nature of sand was one of ~23 v/v % bitumen contained within a ~3 milliDarcy permeable poorly consolidated matrix.

TABLE 22

Emulsion Breaking using both Q'Break 2 kg/m3, let sit 3 hours then add demulsifier. Testing at 23° C.

| Demulsifier | Conc., L/m$^3$ | Notes on emulsion behaviour - 250 mL sample in a graduated glass cylinder. |
|---|---|---|
| None (Blank) | | Emulsion is slowly breaking. There is a a layer of ~12 mL of very dark fluid on top after 3 hours. Large oil drops form and accumulate towards top of fluid. After 48 hours the sample shows a very good oil separation. After 1 week there is the oil layer on top, clear water phase in the middle and solids layer on bottom. |
| RD2069 | 1 | Uppon mixing the RD2069 demulsifier, there was a stringy, gummy precipitate formed. Otherwise, the sample looks similar to the blank but having smaller oil drops accumulating towards the top. Demulsifier cannot be used due to chemical incompatibility with mud components (precipitation). |
| T2005 | 1 | Emulsion seems to very slowly break. There is a a layer of ~9 mL of very dark fluid on top with a definite separation from the lighter layer beneath after 3 hours. However, the rest of the fluid shows no sign of forming visible oil drops. After 48 hours the sample shows the least oil separation of all. After 1 week the is a layer of oil separated but the rest of the fluid is muddy and seems to contain traces of oil. |
| JC91-6B | 1 | Emulsion is slowly breaking. There is a a layer of ~12 mL of very dark fluid on top after 3 hours. Large oil drops form and accumulate towards top of fluid. After 48 hours the sample shows a very good oil separation same as the blank. After 1 week there is the oil layer, clear water phase and solids layer similar to the blank. |

Typical drilling conditions with Polytar are ~400 meters of drilled 311 mm intermediate hole with casing set at 90° inclination from vertical. The 222 mm horizontal section was ~600 meters in length. The following table highlights some of the Polytar drilling parameters as compared to other water-based muds used in the same 84-11 W4 area.

TABLE 23

Drilling Fluid Performance of Bitumen Laden Sands

| System (year) | # of wells | Average m drilled | Average days to TD | Average mud cost | Typical shaker screen design |
|---|---|---|---|---|---|
| $K_2SO_4$ polymer (1998) | 4 | 1077 | 4.8 | $27,755 | 38 * 38 * 38 |
| $K_2SO_4$ polymer (1998) | 6 | 1357 | 4.6 | $10,280 | 38 * 38 * 38 |
| KCl polymer (2003) | 4 | 1505 | 8.8 | $43,907 | 84 * 50 * 38 * 20<br>140 * 110 * 84 * 50 |
| Polytar (2004) | 6 | 1078 | 3.9 | $22,531 | 210 * 175 * 175 * 145<br>210 * 210 * 180 * 145 |

The data shows that the Polytar system has been cost effective. Days to total depth were similar to the 6 well project using $K_2SO_4$ polymer and faster than the KCl polymer and $K_2SO_4$ polymer (4 wells) groupings. Drilling fluid costs for the Polytar system were also very competitive.

The average shaker screen sizes used on the Polytar system were much finer than those used on the other three system groupings. The potassium based systems, which used the larger screen sizes, were designed to carry the insoluble bitumen to surface intact. Typical of these potassium systems however, the bitumen accretes onto metallic surfaces. The shaker screens become less effective when accretion occurs, thus the need for larger screen openings.

The Polytar system solubilizes at least part of the bitumen into the drilling fluid system, thus eliminating accretion and increasing the efficiency of the shaker screens. As a result, cleaning of the drilling fluid system of drilled sand is improved. The sand collected from the shaker screen from the bitumen laden drilled solids contained typically less than 0.5% v/v oil.

The Polytar wells at 84-11 W4 employed centrifuges for additional drilling fluids cleaning functions. In general, the sand coming from the centrifuge underflow was clean enough to meet mix-bury-cover regulations within Alberta. The following tables set out the analyses received from centrifuge underflows at 700 m and 800 m measured depths.

TABLE 24

Hydrocarbon content from Centrifuge Underflows with Polytar
Subsoil Density = 1820 kg/m3; soil:waste mix ratio 3:1
Waste Densities = 2020 and 1975 kg/m3 for 700 m and 800 m

| | 700 m Analyses | 800 m Analyses | Closure Criteria |
|---|---|---|---|
| Benzene | 0 | 0 | 0.073 |
| Toluene | 0 | 0 | 0.86 |
| Ethylbenzene | 0 | 0 | 0.19 |
| Xylenes | 0 | 0 | 25 |
| Fraction 1 | 0 | 0 | 260 |
| Fraction 2 | 170 | 216 | 900 |

TABLE 24-continued

Hydrocarbon content from Centrifuge Underflows with Polytar
Subsoil Density = 1820 kg/m3; soil:waste mix ratio 3:1
Waste Densities = 2020 and 1975 kg/m3 for 700 m and 800 m

| | 700 m Analyses | 800 m Analyses | Closure Criteria |
|---|---|---|---|
| Fraction 3 | 169 | 212 | 800 |
| Fraction 4 | 68 | 85 | 5600 |
| Total HC's | 407 | 513 | |

The embodiments of the invention described above are intended to be exemplary only. The scope of the invention is therefore intended to be limited solely by the scope of the appended claims.

We claim:

1. An emulsifying drilling fluid for drilling in high oil viscosity tar sand formations containing water, tar, sand and oil entrained therein, comprising:
   a polysaccharide based polymer in an amount from between 0.05% and 5% by volume;
   an aliphatic hydrocarbon solvent in an amount from between 1% and 20% by volume for removing tar and oil from said tar sand; whereby an emulsion is formed having said water as an external phase and said aliphatic hydrocarbon as an internal phase of said emulsion, said emulsion containing said oil therein; and
   an enzyme based emulsion breaker in an amount from between 0.05% and 10% by volume for releasing said oil from said emulsion.

2. The drilling fluid as set forth in claim 1, wherein said polymer is a polymer system.

3. The drilling fluid as set forth in claim 2, wherein said polymer system includes at least polysaccharide gum, starch and PAC polyanionic cellulose.

* * * * *